US011893923B2

(12) United States Patent
Lin et al.

(10) Patent No.: US 11,893,923 B2
(45) Date of Patent: Feb. 6, 2024

(54) DISPLAY APPARATUS AND METHOD FOR CALIBRATING SCREEN DIMMING THEREOF

(71) Applicant: GIGA-BYTE TECHNOLOGY CO., LTD., New Taipei (TW)

(72) Inventors: Cheng-Lung Lin, New Taipei (TW); Chih-Cheng Huang, New Taipei (TW); Tzu-Yi Tsao, New Taipei (TW); Chia-En Liu, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/829,707

(22) Filed: Jun. 1, 2022

(65) Prior Publication Data

US 2023/0206809 A1 Jun. 29, 2023

(30) Foreign Application Priority Data

Dec. 29, 2021 (TW) ................................ 110149328

(51) Int. Cl.
*G09G 3/20* (2006.01)

(52) U.S. Cl.
CPC ... *G09G 3/2003* (2013.01); *G09G 2320/0626* (2013.01); *G09G 2320/0666* (2013.01);
(Continued)

(58) Field of Classification Search
CPC ....... G09G 2320/02; G09G 2320/0242; G09G 2320/0626; G09G 2320/0666;
(Continued)

(56) References Cited

U.S. PATENT DOCUMENTS 7,800,625 B2 9/2010 Liu et al.
9,442,562 B2 * 9/2016 Atkins .................... G06F 3/011
(Continued)

FOREIGN PATENT DOCUMENTS

CN 113498535 A 10/2021
EP 3 401 899 B1 9/2021
TW 202145189 A 12/2021

OTHER PUBLICATIONS

Taiwanese Office Action and Search Report for Taiwanese Application No. 110149328 dated Aug. 10, 2022.
(Continued)

*Primary Examiner* — Kenneth Bukowski
(74) *Attorney, Agent, or Firm* — Birch, Stewart, Kolasch & Birch, LLP

(57) ABSTRACT

A display apparatus is provided, which includes a display module, a biosensor, an ambient-light sensor, and a display controller. The ambient-light sensor is configured to detect ambient-light brightness and an ambient-light color temperature of the display apparatus. The display controller is configured to receive a video signal from a host, and displays the video signal on the display module. When the biosensor detects that a user is located in front of the display apparatus, the biosensor transmits an image-adjustment control signal to the display controller to control the display apparatus to enter an image-adjustment mode. When the display apparatus is in the image-adjustment mode, the display controller adjusts screen brightness and a screen color temperature of the image signal displayed on the display module according to the ambient-light brightness and the ambient-light color temperature.

9 Claims, 5 Drawing Sheets

(52) U.S. Cl.
CPC . *G09G 2320/0693* (2013.01); *G09G 2354/00* (2013.01); *G09G 2360/144* (2013.01)

(58) Field of Classification Search
CPC ....... G09G 2320/0693; G09G 2320/08; G09G 2354/00; G09G 2360/144; G09G 3/2003; G09G 5/02
See application file for complete search history.

(56) References Cited

U.S. PATENT DOCUMENTS

| | | | | |
|---|---|---|---|---|
| 2013/0082991 | A1* | 4/2013 | Lin | G09G 5/00 345/207 |
| 2016/0351133 | A1 | 12/2016 | Kim et al. | |
| 2017/0045936 | A1 | 2/2017 | Kakapuri | |
| 2018/0182357 | A1 | 6/2018 | Yun et al. | |
| 2020/0204853 | A1* | 6/2020 | Mehrl | H04N 21/42202 |

OTHER PUBLICATIONS

European Search Report for European Application No. 22179322.7 dated Oct. 27, 2022.
Japanese Office Action for Japanese Application No. 2022-172582, dated Sep. 5, 2023, with English translation.

* cited by examiner

DISPLAY APPARATUS AND METHOD FOR CALIBRATING SCREEN DIMMING THEREOF

CROSS REFERENCE TO RELATED APPLICATIONS

This Application claims priority of Taiwan Patent Application No. 110149328, filed on Dec. 29, 2021, the entirety of which is incorporated by reference herein.

BACKGROUND OF THE INVENTION

Field of the Invention

The invention relates to display apparatuses, and, in particular, to an electronic device and a method for calibrating screen dimming thereof.

Description of the Related Art

Due to advancements in technology, computer users spend more and more time using monitors every day. In some applications, the screen brightness of the display is always at a high setting. Users who use the computer under different ambient light conditions for a long time with the same display screen brightness may experience visual fatigue.

BRIEF SUMMARY OF THE INVENTION

In view of the above, an electronic device and a method for calibrating screen dimming thereof are provided to solve the aforementioned problem.

In an exemplary embodiment, a display apparatus is provided, which includes a display module, a biosensor, an ambient-light sensor, and a display controller. The ambient-light sensor is configured to detect ambient-light brightness and an ambient-light color temperature of the display apparatus. The display controller is configured to receive a video signal from a host and to display the video signal on the display module. When the biosensor detects that a user is located in front of the display apparatus, the biosensor transmits an image-adjustment control signal to the display controller to control the display apparatus to enter an image-adjustment mode. When the display apparatus is in the image-adjustment mode, the display controller adjusts screen brightness and a screen color temperature of the image signal displayed on the display module according to the ambient-light brightness and the ambient-light color temperature.

In some embodiments, the display apparatus further includes a distance sensor, configured to detect a distance and an orientation between the user and the display module, and to report the distance and the orientation to the display controller.

In some embodiments, the image-adjustment mode comprises a first dynamic brightness-adjustment mode, wherein in the first dynamic brightness-adjustment mode, the display controller further executes the following operations: when the distance is longer than a first distance, increasing the screen brightness of the image signal displayed on the display module; when the distance is between the first distance and half of the first distance, maintaining the screen brightness of the image signal displayed on the display module; when the distance is shorter than half of the first distance, reducing the screen brightness of the image signal displayed on the display module by a first brightness ratio; when the distance is shorter than a second distance, reducing the screen brightness of the image signal displayed on the display module by a second brightness ratio, wherein the first distance is greater than 2 times the second distance, and the second brightness ratio is greater than the first brightness ratio.

In some embodiments, the first distance corresponds to the users optimal horizontal field of view (FoV), and the second distance corresponds to the user's maximum horizontal FoV.

In some embodiments, the image-adjustment mode comprises a second dynamic brightness-adjustment mode. In the second dynamic brightness-adjustment mode, the display controller further executes the following operations: when the ambient-light brightness is between a first brightness and a second brightness, linearly adjusting the screen brightness of the display module at a first slope according to the ambient-light brightness; when the ambient-light brightness is higher than or equal to the second brightness, linearly adjusting the screen brightness of the display module at a second slope according to the ambient-light brightness; and when the ambient-light brightness is lower than the first brightness, linearly adjusting the screen brightness of the display module at a third slope according to the ambient-light brightness, wherein the second brightness is higher than the first brightness, and the first slope, the second slope, and the third slope are greater than 0, and the second slope is greater than the first slope, and the first slope is greater than the third slope.

In some embodiments, the image-adjustment mode comprises a dynamic color-temperature-adjustment mode, wherein in the dynamic color-temperature-adjustment mode, the display controller further executes the following operations: when the ambient-light color temperature is higher than a predetermined color temperature, increasing the screen color temperature of the image signal displayed on the display module; and when the ambient-light color temperature is lower than or equal to the predetermined color temperature, reducing the screen color temperature of the image signal displayed on the display module.

In another exemplary embodiment, a method for calibrating screen dimming of a display apparatus is provided. The display apparatus comprises a display module, a biosensor, an ambient-light sensor, and a display controller. The ambient-light sensor detects ambient-light brightness and an ambient-light color temperature of the display apparatus. The method includes the following steps: utilizing the display controller to receive a video signal from a host, and displaying the video signal on the display panel; when the biosensor detects that a user is located in front of the display apparatus, utilizing the biosensor to transmit an image-adjustment control signal to the display controller to control the display apparatus to enter an image-adjustment mode; and when the display apparatus is in the image-adjustment mode, utilizing the display controller to adjust screen brightness and a screen color temperature of the image signal displayed on the display module according to the ambient-light brightness and the ambient-light color temperature.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
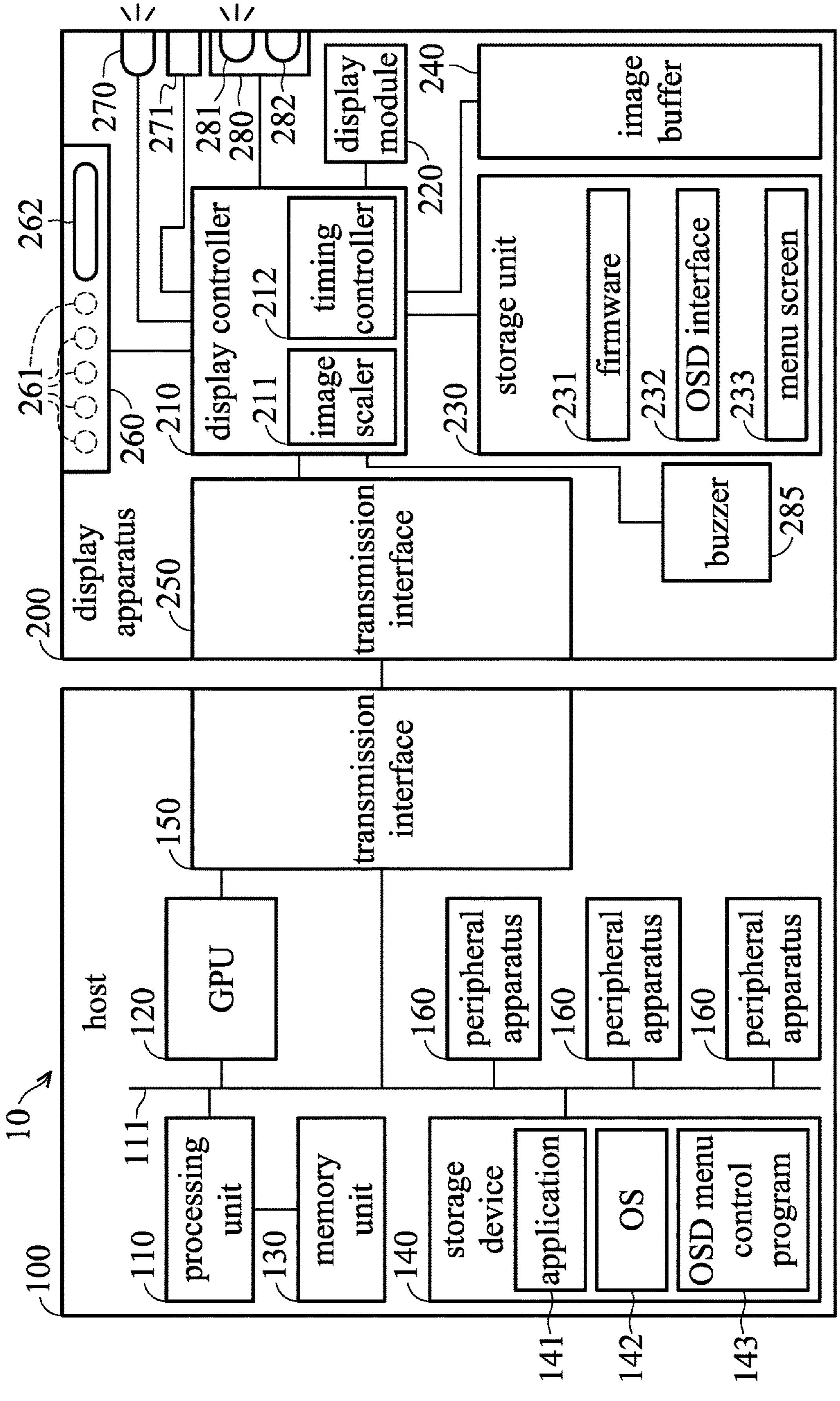
FIG. 1 is a block diagram of a computer system in accordance with an embodiment of the invention.

FIG. 1 is a block diagram of a computer system in accordance with an embodiment of the invention. The computer system 10, for example, may be a personal computer or server equipped with a display apparatus. As illustrated in FIG. 1, the computer system 10 includes a host 100 and a display apparatus 200, wherein the host 100 has a signal connection to the display apparatus 200. For example, the host 100 may include a processing unit 110, a graphics processing unit (GPU) 120, a memory unit 130, a storage device 140, one or more transmission interfaces 150, and one or more peripheral apparatuses 160. The processing unit 110, graphics processing unit 120, memory unit 130, storage device 140, transmission interfaces 150, and peripheral apparatuses 160 may be coupled to each other via the system bus 111. The processing unit 110, for example, may be a central processing unit (CPU), a general-purpose processor, etc., but the invention is not limited thereto. The graphics processing unit 120, for example, may be a graphics processing unit on a video adapter or integrated into the processing unit 110.

The memory unit 130 may be a random access memory such as a static random access memory (SRAM) or a dynamic random access memory (DRAM), but the invention is not limited thereto. The storage device 140 may be a non-volatile memory such as a hard-disk drive, a solid-state disk (SSD), a flash memory, or a read-only memory (ROM), but the invention is not limited thereto.

The transmission interface 150 may include wired transmission interfaces and/or wireless transmission interfaces. The wired transmission interfaces may include: high definition multimedia interface (HDMI), DisplayPort (DP) interface, embedded DisplayPort (eDP) interface, Universal Serial Bus (USB) interface, USB Type-C interface, Thunderbolt interface, digital video interface (DVI), video graphics array (VGA) interface, general purpose input/output (GPIO) interface, universal asynchronous receiver/transmitter (UART) interface, serial peripheral interface (SPI), inter-integrated circuit (I2C) interface, or a combination thereof. The wireless transmission interfaces may include Bluetooth, WiFi, near-field communication (NFC) interface, etc., but the invention is not limited thereto. The peripheral apparatus 160, for example, may include input apparatuses such as a keyboard, a mouse, a touch pad, etc., but the invention is not limited thereto.

For example, the storage device 140 may store one or more applications 141, an operating system 142 (e.g., Windows, Linux, MacOS, etc.), and an OSD menu control program 143. The processing unit 110 may load the applications 141, the operating system 142, and the OSD menu control program 143 to the memory unit 130 for execution. The OSD menu control program 143 is configured to allow the user to control the OSD menu of the display apparatus 200 through the peripheral apparatus 160 of the host 100. The graphics processing unit 120 may, for example, perform graphics processing on the application being executed by the processing unit 110 to generate an image signal that includes one or more images, and transmit the image signal to the display controller 210 of the display apparatus 200 via the transmission interfaces 150 and 250 (e.g., HDMI or DisplayPort interface).

The display apparatus 200, for example, may be a flat panel display, a television, a projector, or a computer monitor, but the invention is not limited thereto. The display apparatus 200 includes a display controller 210, a display module 220, a storage unit 230, an image buffer 240, one or more transmission interface 250, an input interface 260, a biosensor 270, an ambient-light sensor (ALS) 271, and a distance sensor 280. For example, the distance sensor may be implemented by different ranging technologies such as ToF (time of flight) ranging, ultrasonic ranging, infrared ranging, or laser ranging, but the invention is not limited thereto.

The transmission interface 250 may include wired transmission interfaces and/or wireless transmission interfaces. The wired transmission interfaces may include: high definition multimedia interface (HDMI), DisplayPort (DP) interface, embedded DisplayPort (eDP) interface, Universal Serial Bus (USB) interface, USB Type-C interface, Thunderbolt interface, digital video interface (DVI), video graphics array (VGA) interface, general purpose input/output (GPIO) interface, universal asynchronous receiver/transmitter (UART) interface, serial peripheral interface (SPI), inter-integrated circuit (I2C) interface, or a combination thereof. The wireless transmission interfaces may include Bluetooth, WiFi, near-field communication (NFC) interface, etc., but the invention is not limited thereto.

The display controller 210, for example, may be implemented by an application-specific integrated circuit (ASIC), a system-on-chip (SoC), a processor, or a microcontroller, but the invention is not limited thereto.

The display module 220, for example, may be a liquid-crystal display panel, a light-emitting diode (LED) display panel, an organic light-emitting diode (OLED) display panel, a cathode ray tube (CRT) display, an E-Ink display module, an electroluminescent display module, a plasma display module, a projection display module, or a quantum dot display module, but the invention is not limited thereto.

The storage unit 230, for example, may be a non-volatile memory such as a read-only memory (ROM), an erasable programmable read-only memory (EPROM), an electrically erasable programmable read-only memory (EEPROM), etc., but the invention is not limited thereto. The storage unit 230 is configured to store firmware 231 associated with the display apparatus 200. The storage unit 230 may be disposed outside the display controller 210, or alternatively integrated into the display controller 210.

The firmware 231, for example, may include extended display identification data (EDID) and display settings of the display apparatus 200, one or more on-screen-display (OSD) interfaces 232, and a menu screen 233. The EDID, for example, may include information such as the manufacturer, product name, resolution, frames per second (FPS) of the display apparatus 200. The display settings of the display apparatus 200 may include the brightness, contrast, sharpness, color temperature of the display apparatus 200.

In an embodiment, the display controller 210 may read the firmware 231 and program code of the OSD interface 232 stored in the storage unit 230 via a bus (e.g., an I2C bus), and configure the corresponding display parameters. In addition, the display controller 210 may transmit the EDID of the display apparatus 200 to the host 100 via one of the transmission interfaces 250 (e.g., may be an image-transmission channel or a data-transmission channel), so that the processing unit 110 and the graphics processing unit 120 in the host 100 may configure the resolution and corresponding synchronization signals of the output image signal based on the EDID. The OSD interfaces 232, for example, may include an OSD menu and corresponding options, an information dashboard, a timer, a counter, a crosshair, a specific symbol, a specific color, a specific text, or a combination thereof, but the invention is not limited thereto.

The image buffer 240, for example, may be a volatile memory (e.g., a DRAM) or a non-volatile memory e.g., a flash memory), that is configured to store output images to be displayed on the display module 220, wherein the host 100 or the display controller 210 may, according to an OSD enable signal generated by the host 100, overwrite a specific region of the image signal stored in the image buffer 240 with the one or more OSD interfaces 232.

The input interface 260 is configured to control the OSD menu of the display apparatus 200. The input interface 260 may be implemented by one or more physical buttons 261 or a five-way joystick 262 to implement instructions such as up, down, left, right, and confirm.

In an embodiment, when the user performs an operation in one direction of the five-way joystick 262 (or presses one of the physical buttons 261), the display controller 210 may read the firmware 231 and the program code or firmware of the OSD menu and corresponding options of the OSD interfaces 232 from the storage unit 230, and display the OSD menu and corresponding options on the display module 220. In an embodiment, the user may perform operations on the input interface 260 to control the OSD menu of the display apparatus to adjust the brightness, contrast, sharpness, color temperature, or activate or deactivate other interfaces among the OSD interfaces 232. In another embodiment, the activating and deactivating of the OSD interfaces 232 and the content displayed on the OSD interface 232, for example, can be controlled by the peripheral apparatus 160 of the host 100, where the details will be described later.

For example, the firmware 231 can be regarded as the default firmware of the display apparatus 200, and the user may control the settings of the OSD interface 232 displayed on the display apparatus 200 via the five-way joystick 262 (or the physical buttons 261).

In an embodiment, the display controller 210 may include an image scalar 211 and a timing controller 212. The display controller 210 may receive the image signal from the host 100 and/or another signal from other hosts via one of the transmission interfaces 250, and the image scalar 211 may perform an image-scaling process and/or image-overlaying process on the received image signals to fit the resolution of the display module 220, and store the images output images) generated by the image-scaling process to the image buffer 240. The timing controller 212 may control the display module 220 to read the output images from the image buffer 240 for displaying.

In another embodiment, the display controller 210 may include the timing controller 212, and the resolution of the image signal from the host 100 may fit that of the display module 220. Thus, the display controller 210 may directly store the received image signal from the host 100 to the image buffer 240 without performing the image-scaling process. The timing controller 212 may read the output images stored in the image buffer 240, and control the display module 220 to display the output images.

The biosensor 270, ambient-light sensor 271, and distance sensor 280 are electrically connected to the display controller 210. The biosensor 270 is configured to detect whether the user is located within a predetermined range (e.g., 33 to 150 cm, but not limited) in front of the display apparatus 200. When the biosensor 270 detects that the user is in front of the display apparatus 200, the biosensor 270 can further detect the distance between the user and the display apparatus, and can detect the user's heartbeat or pulse at the same time, and even the breathing rate. In some embodiments, the biosensor 270 can be implemented by, for example, a millimeter wave (mmWave) sensor, which can be disposed in front of the display apparatus 200 and emit millimeter waves with a frequency of 30 GHz to 300 GHz.

When the user is located in front of the display apparatus 200, the millimeter waves emitted by the biosensor 270 will be reflected by the user, and the biosensor 270 can receive the reflected millimeter waves to detect tiny pulses, such as heartbeats, pulses, or a breathing rate, of the user. Accordingly, When the biosensor 270 has detected that the user is located within a predetermined distance range (e.g., 30 to 150 cm), the biosensor 270 may transmit an image-adjustment control signal and information about the heartbeat rate, pulse rate, or breathing rate to the display controller 210, wherein the display controller 210 may control the display apparatus 200 to enter an image-adjustment mode according to the image-adjustment control signal. For example, the picture-adjustment mode may include a first dynamic brightness-adjustment mode, a second dynamic brightness-adjustment mode, and a dynamic color-temperature adjustment mode, the details of which are described below.

The display controller 210 may receive the information about the heartbeat rate, pulse rate, or breathing rate from the biosensor 270, and displays the received information about the heartbeat rate, pulse rate, or breathing rate on the display module 220 using the function of the OSD interface 232. The display controller 210 may determine whether the heartbeat rate or pulse rate is lower than a first predetermined heart rate (e.g., 40 heartbeats/pulses per minute) or higher than a second predetermined heart rate (e.g., 100 heartbeats/pulses per minute). When the display controller 210 determines that the heartbeat rate or pulse rate of the user is lower than the first predetermined heart rate or higher than the second predetermined heart rate, the display controller 210 may display a warning message on a specific location of the screen displayed on the display module using the OSD interface 232, and transmit another control signal to the buzzer 285 to control the buzzer 285 to emit a warning sound to remind the user.

The ambient-light sensor 271 is configured to detect the illuminance (or brightness) and the color temperature of the ambient light where the display apparatus 200 is located, and the color temperature can be represented by the chroma of the red, green, and blue lights. The ambient-light sensor 271 may detect the intensity and color temperature of the ambient light at a frequency of several to dozens of times per second.

The distance sensor 280 is configured to detect the orientation and distance of the object in front of the display apparatus 200. For example, the distance sensor 280 may include a light source 281 and an image sensor 282, wherein the light source 281 may be implemented by a light-emitting diode (LED) or a laser diode. The light source 281 may emit infrared light toward the front of the display apparatus, and the infrared light will be reflected by objects in front the display apparatus 200. The image sensor 282 can be, for example, an infrared image sensor, which can receive infrared light reflected by objects in front of the display apparatus 200. Since the speed of light (v) is known, the image sensor 282 can calculate the distance d (i.e., depth) of different positions of the object according to the time (1) of the reflected infrared light at different depths of the object, for example, d=v*t.

In some other embodiments, the light source 281 can be implemented by, for example, a laser diode or a digital light processor (DLP), which can emit infrared lights of different light patterns toward the front of the display apparatus 200, and the image sensor 282 may be an infrared-light image sensor, which can receive the infrared light reflected by the object in front of the display apparatus. Accordingly, when the light source 281 emits infrared light toward the front of the display apparatus 200, the infrared light will be reflected by the object in front of the display apparatus 200, and the reflected light at different depths of the object in front of the display apparatus 200 will cause the light pattern to be distorted. Therefore, the image sensor 282 can detect the three-dimensional structure of the object in front of the display apparatus 200.

Figure 2A:
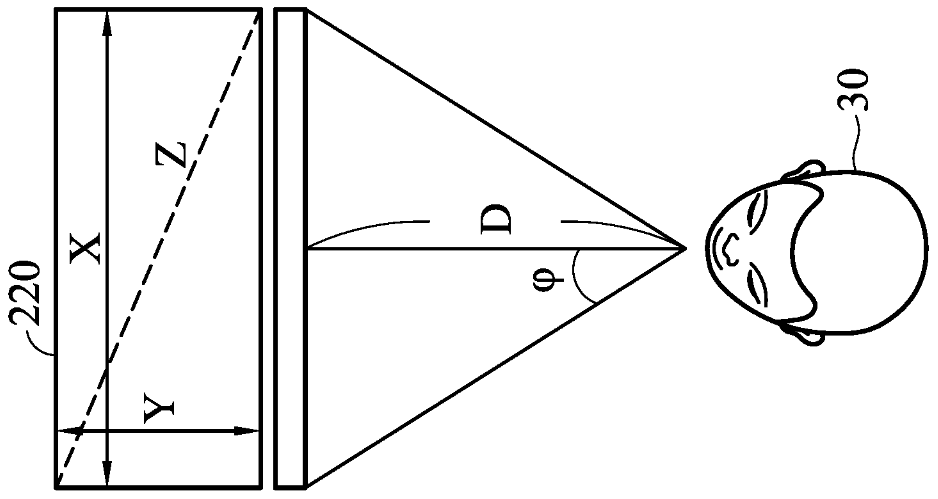
FIG. 2A is a diagram of a user in an optimal horizontal field of view (RAT) in accordance with an embodiment of the invention.
Figure 2B:
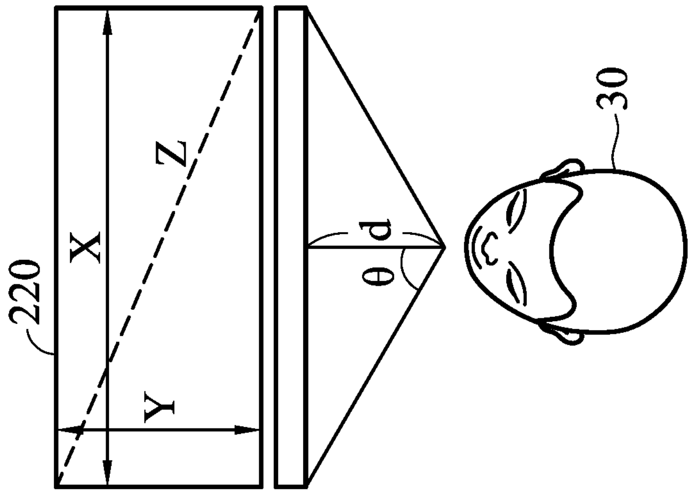
FIG. 2B is a diagram of a user in a maximum horizontal FoV in accordance with an embodiment of the invention.
Figure 2C:
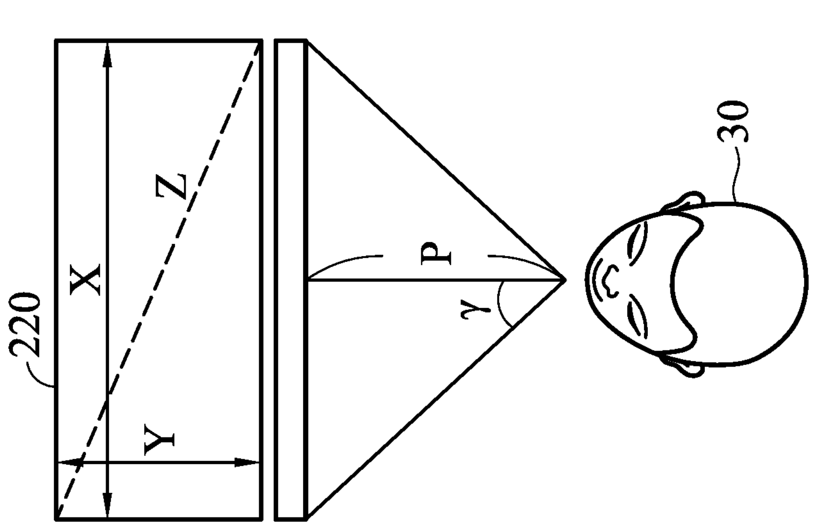
FIG. 2C is a diagram of a general horizontal FoV of a user in accordance with an embodiment of the invention.

FIG. 2A is a diagram of a user in an optimal horizontal field of view (FoV) in accordance with an embodiment of the invention. FIG. 2B is a diagram of a user in a maximum horizontal FoV in accordance with an embodiment of the invention. FIG. 2C is a diagram of a general horizontal FoV of a user in accordance with an embodiment of the invention. Please refer to FIG. 1 and FIGS. 2A-2C.

Assuming that the horizontal, vertical, and diagonal dimensions of the display module 220 of the display apparatus 200 are X, Y, and Z centimeters, respectively, when the user 30 is viewing the display apparatus 200 with an optimal horizontal FoV (e.g., with a horizontal FoV between 90 to 105 degrees), the distance between the user 30 and the display module 220 is D. If the line of sight of the user 30 is aligned with the center point of the display module 220, the angle between the line of sight of the user 30 and the display module 220 is φ, as shown in FIG. 2A. At this time, the relationship between the distance D, the angle φ, and the size of the display module 220 can be expressed by equation (1):

$$Z=[(2D\cdot\tan\varphi)^2+Y^2]^{1/2} \quad (1)$$

In addition, when the user 30 is viewing the display apparatus 200 with the maximum horizontal FoV (e.g., a horizontal FoV of about 140 degrees), the distance between the user 30 and the display module 220 is d, if the line of sight of the user 30 is aligned with the center of the display module 200, the angle between the line of sight of the user 30 and the display module 220 is θ, as shown in FIG. 2B. At this time, the relationship between the distance d, the angle θ, and the size of the display module 220 can be expressed by equation (2):

$$Z=[(2d\cdot\tan\theta)^2+Y^2]^{1/2} \quad (2)$$

In general use cases, the distance D (e.g., a first distance) is greater than twice the distance d (e.g., a second distance). The distance sensor 280 of the display apparatus 200 may detect the distance P between the user 30 and the display module 220, and detect the included angle γ between the line of sight of the user 30 and the display module 220, as shown in FIG. 2C. The display controller 210 can obtain the information associated with the distance P and the included angle γ from the distance sensor 280, and determine whether to adjust the screen brightness of the display apparatus 200 according to the distance P.

For example, the display controller 210 may further include a first dynamic brightness-adjustment mode, which can further linearly adjust the screen brightness of the display module 220 according to the distance D between the user 30 and the display module 220. In the first dynamic brightness-adjustment mode, when the display controller 210 determines that the distance P is greater than the distance D, it means that the distance between the user 30 and the display module 220 is farther, so the display controller 210 can slightly increase the brightness of the image signal displayed on the display module 220. When the display controller 210 determines that D≥distance P≥D/2, it means that the distance between the user 30 and the display module 220 is within a range that is suitable for viewing, so the display controller 210 will not adjust the brightness of the image signal displayed on the display module 220 at this time.

When the display controller 210 determines that the distance P<D/2 or the distance P is between the distance d and D/2, it means that the distance between user 30 and the display module 220 is relatively close, so the display controller 210 will perform a first image brightness-reduction process to reduce the brightness of the image signal displayed on the display module 220, such as reducing the brightness by a first brightness ratio (e.g., 3%, but not limited) or a first predetermined brightness value (e.g., 30, but not limited).

When the display controller 210 determines that the distance P<distance d, it means that the distance between the user 30 and the display module 220 is very close, so the display controller will perform a second image brightness-reduction process at this time to reduce the brightness of the image signal displayed on the display module 220, such as reducing the brightness by a second brightness ratio (e.g., 10%, but not limited) or a second predetermined brightness value (e.g., 50, but not limited). In other words, compared with the first image brightness-reduction process, the second image brightness-reduction process further reduces the brightness of the image signal displayed on the display module 220. Accordingly, when the user 30 is viewing the display apparatus 200 at a very close distance, the display apparatus 200 can automatically reduce the screen brightness to ensure the user's viewing quality. In addition, when the user 30 is viewing the display apparatus 200 from a longer distance, the display apparatus 200 can also automatically increase the screen brightness to ensure the user's viewing quality.

In brief, because the size of the display module 220 is known, the display controller 210 can calculate the horizontal FoV of the distance where the user is located according to the size of the display module 220, and then adjust the screen brightness of the display module 220 according to the determination mechanism of the aforementioned embodiment.

Figure 3A:
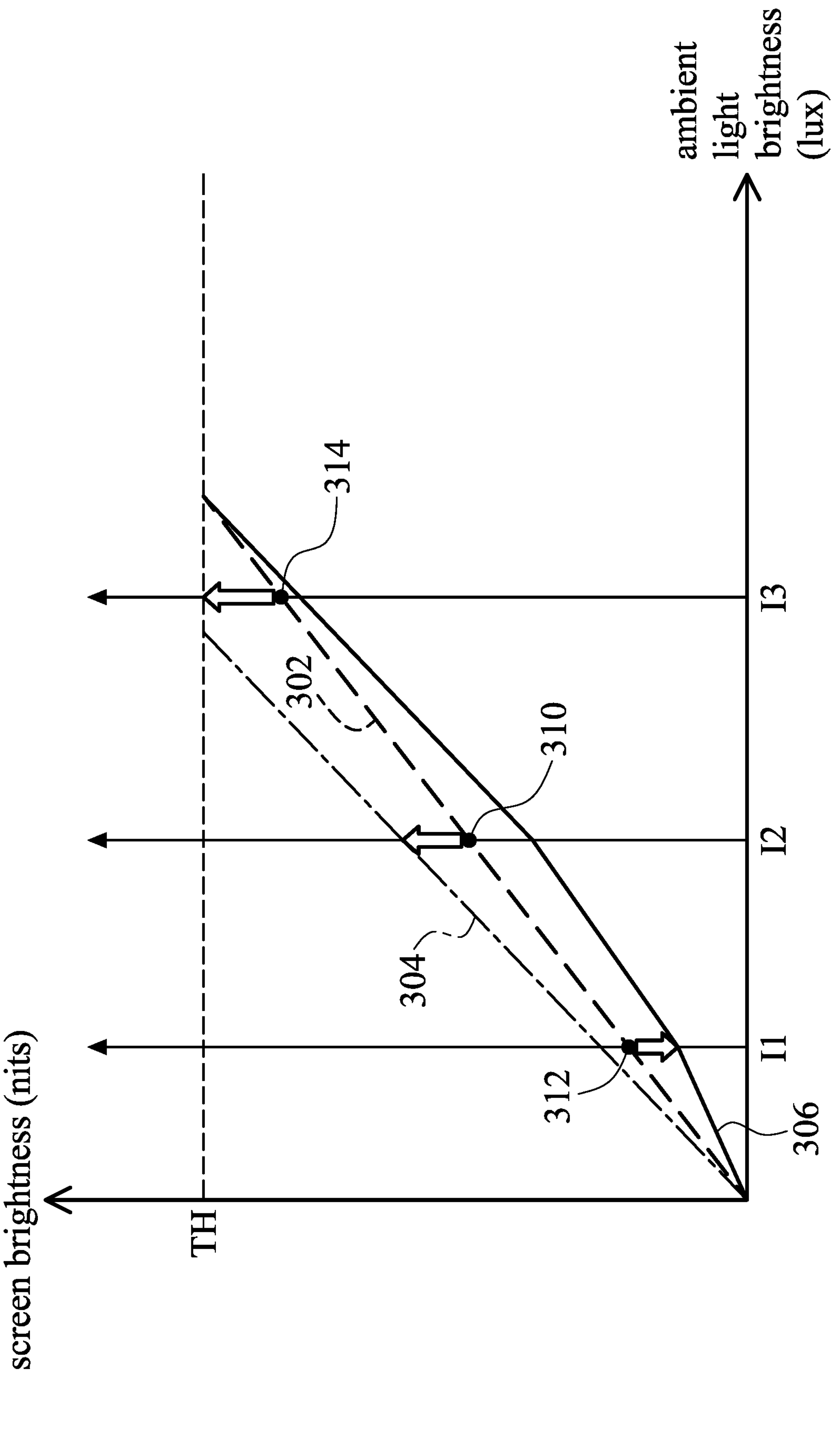
FIG. 3A is a diagram of adjusting the screen brightness of the display apparatus according to the ambient light brightness in accordance with an embodiment of the invention.

FIG. 3A is a diagram of adjusting the screen brightness of the display apparatus according to the ambient light brightness in accordance with an embodiment of the invention. Please refer to FIG. 1 and FIG. 3A.

In an embodiment, the display controller 210, for example, may preset a relationship curve between the ambient light brightness and the screen brightness of the display module 220, such as curve 302 in FIG. 3A. It means that the display controller 210 can linearly adjust the screen brightness of the display module 220 according to the ambient light brightness (or illuminance, in lux) of the position of the display apparatus 200 detected by the ambient-light sensor 271, as shown in FIG. 3A. However, if the display controller 210 only linearly adjusts the screen brightness of the display module 220 according to curve 302, the screen brightness may not properly reflect the ambient-light brightness of the display apparatus 200, which may cause discomfort to the user when viewing the display apparatus 200.

In an embodiment, the display controller 210 may further include a second dynamic brightness-adjustment mode, such as further adjusting the screen brightness of the display module 220 for high and low ambient-light brightness, respectively. Assuming that the display controller 210 is in the second dynamic brightness-adjustment mode, when the ambient-light brightness is between a first brightness (e.g., I1) and a second brightness (e.g., I2) (i.e., a medium-high illumination environment), it means that the ambient-light brightness of the display apparatus 200 is moderate, so the display controller 210 may linearly adjust the screen brightness of the display module 220 with a first slope (e.g., curve 302) according to the ambient-light brightness in the brightness interval between points 312 and 310.

When the ambient-light brightness is higher than or equal to the second brightness (e.g., I2) and is lower than the third brightness (e.g., I3), it means that the ambient-light brightness of the display apparatus 200 is relatively high (i.e., high-intensity ambient light), so the display controller 210 may linearly adjust the screen brightness of the display module 220 with a second slope (e.g., curve 304) according to the ambient-light brightness in the brightness interval between points 310 and 314, wherein the second slope is higher than the first slope. Accordingly, in a brighter environment, the display apparatus 200 can linearly increase the screen brightness of the display module 220 with a larger magnification factor as the ambient-light brightness increases, and this process can also be referred to as a first slope correction. It should be noted that when the screen brightness of the display module 220 gradually increases and reaches the upper brightness limit TH, the display controller 210 may control the screen brightness of the display module 220 to be maintained at the brightness upper limit TH.

When the ambient-light brightness is lower than the first brightness (e.g., I1), it means that the ambient light of the display apparatus 200 is low (i.e., low-intensity ambient light), so the display controller 210 may linearly adjust the screen brightness of the display module 220 with a third slope (e.g., curve 306) according to the ambient-light brightness in the brightness interval between point 312 and the origin at this time, wherein the first slope is greater than the third slope. Accordingly, in a low illumination environment, the display apparatus 200 can linearly reduce the screen brightness of the display module 220 at a lower magnification factor as the ambient-light brightness decreases, and this process can also be referred to as a second slope correction. In the embodiment of FIG. 3A, the first slope, the second slope, and the third slope are all greater than 0, and the second slope is greater than the first slope, and the first slope is greater than the third slope.

Figure 3B:
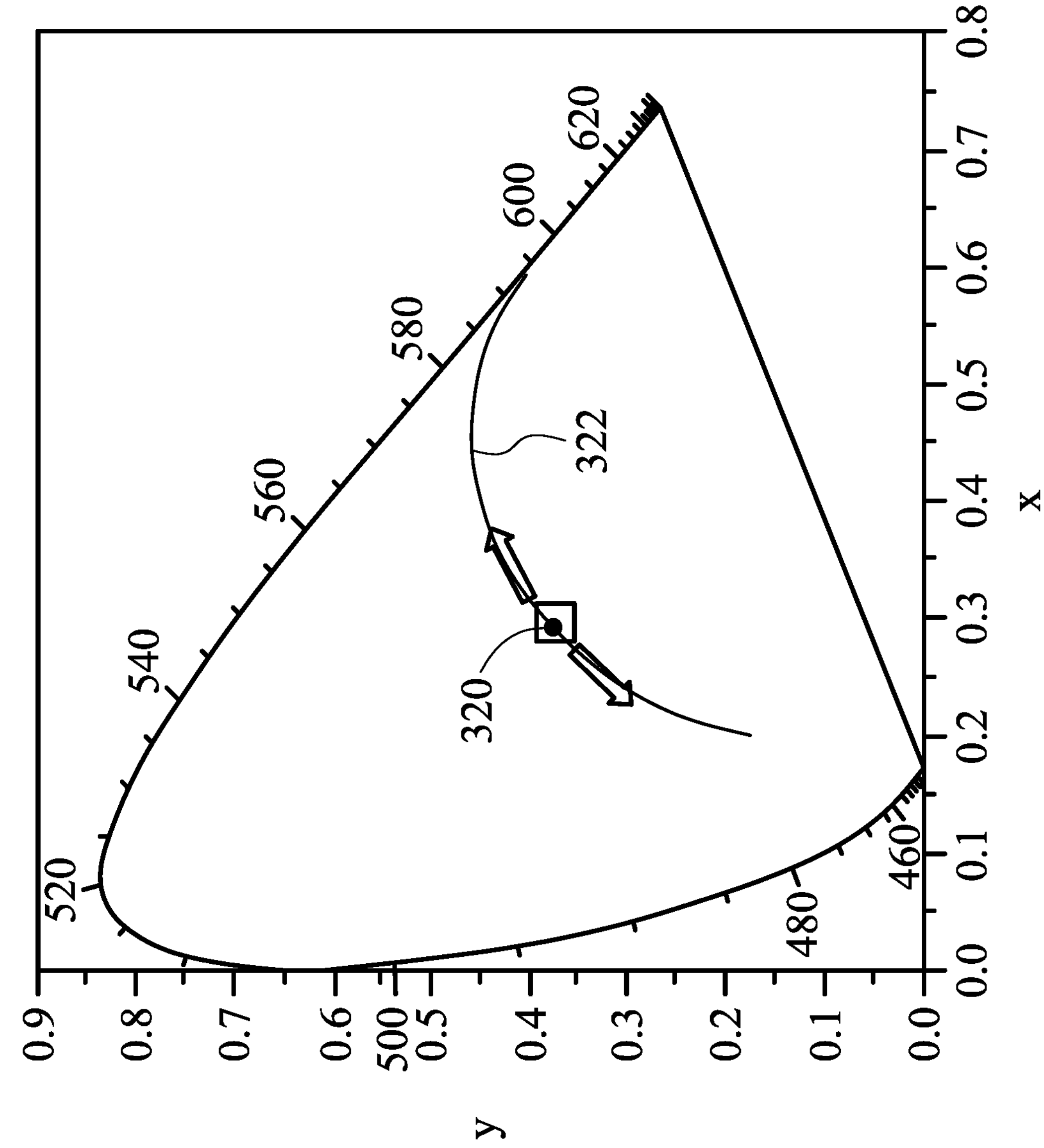
FIG. 3B is a diagram of adjusting the color temperature of the display apparatus according to the ambient-light brightness in accordance with an embodiment of the invention.

FIG. 3B is a diagram of adjusting the color temperature of the display apparatus according to the ambient-light brightness in accordance with an embodiment of the invention. Please refer to FIG. 1 and FIG. 3B.

FIG. 3B shows the CIE 1931 color space. In an embodiment, the display controller 210 may, for example, preset a predetermined color temperature for viewing by the user, such as point 320 in FIG. 3B (e.g., corresponding to a color temperature of 5500K), where the right side of point 320 represents a low color-temperature area (e.g., about 3000K-4500K), and the left side of point 320 represents a high color-temperature area (e.g., about 6000K or above). Generally speaking, the color temperature used by the ambient-light source is about 3000K to 6000K.

In the embodiment, the display controller 210 may obtain the ambient-light color-temperature information of the location where the display apparatus 200 is located from the ambient-light sensor 271, and adjusts the color temperature of the image signal displayed on the display module 220 according to the ambient-light color-temperature information. For example, if the light source at the location of the display apparatus 200 is a fluorescent light bulb or a halogen light bulb, the ambient-light color-temperature information will be biased toward a lower color temperature, that is, the light source will be biased toward a warm color system. At this time, the display controller 210 may adjust the color temperature of the image signal displayed on the display module 220 to a lower color temperature according to the ambient-light color-temperature information, such as the right arrow on curve 322 in FIG. 3B. Accordingly, the color temperature of the picture perceived by the user when watching the image signal displayed on the display module 220 can be approximately similar to the ambient light, so as to reduce the burden on the user's eyes.

If the light source at the location of the display apparatus 200 is a cathode lamp, an incandescent light bulb, or other high-color-temperature light source, the ambient-light color-temperature information will be biased toward a higher color temperature, that is, the light source will be biased toward a cool color system. At this time, the display controller 210 can adjust the color temperature of the image signal displayed on the display module 220 to a higher color temperature according to the ambient-light color-temperature information, such as the left arrow on curve 322 in FIG. 3B. Accordingly, the color temperature of the picture perceived by the user when watching the image signal displayed on the display module 220 can be approximately similar to the ambient light, so as to reduce the burden on the user's eyes.

In brief, the display controller 210 may further include a dynamic color-temperature-adjustment mode, such as adjusting the screen color temperature of the display module 220 according to ambient light with different color temperatures, so as to allow the user to view the screen with a color temperature which is similar to the color temperature of the ambient light to reduce the burden on the eyes. For example, when the ambient-light color temperature is higher than a predetermined color temperature, the display controller 210 may increase the color temperature of the image signal displayed on the display module 220. When the ambient-light color temperature is lower than or equal to the predetermined color temperature, the display controller may decrease the color temperature of the image signal displayed on the display module 220.

Figure 4:
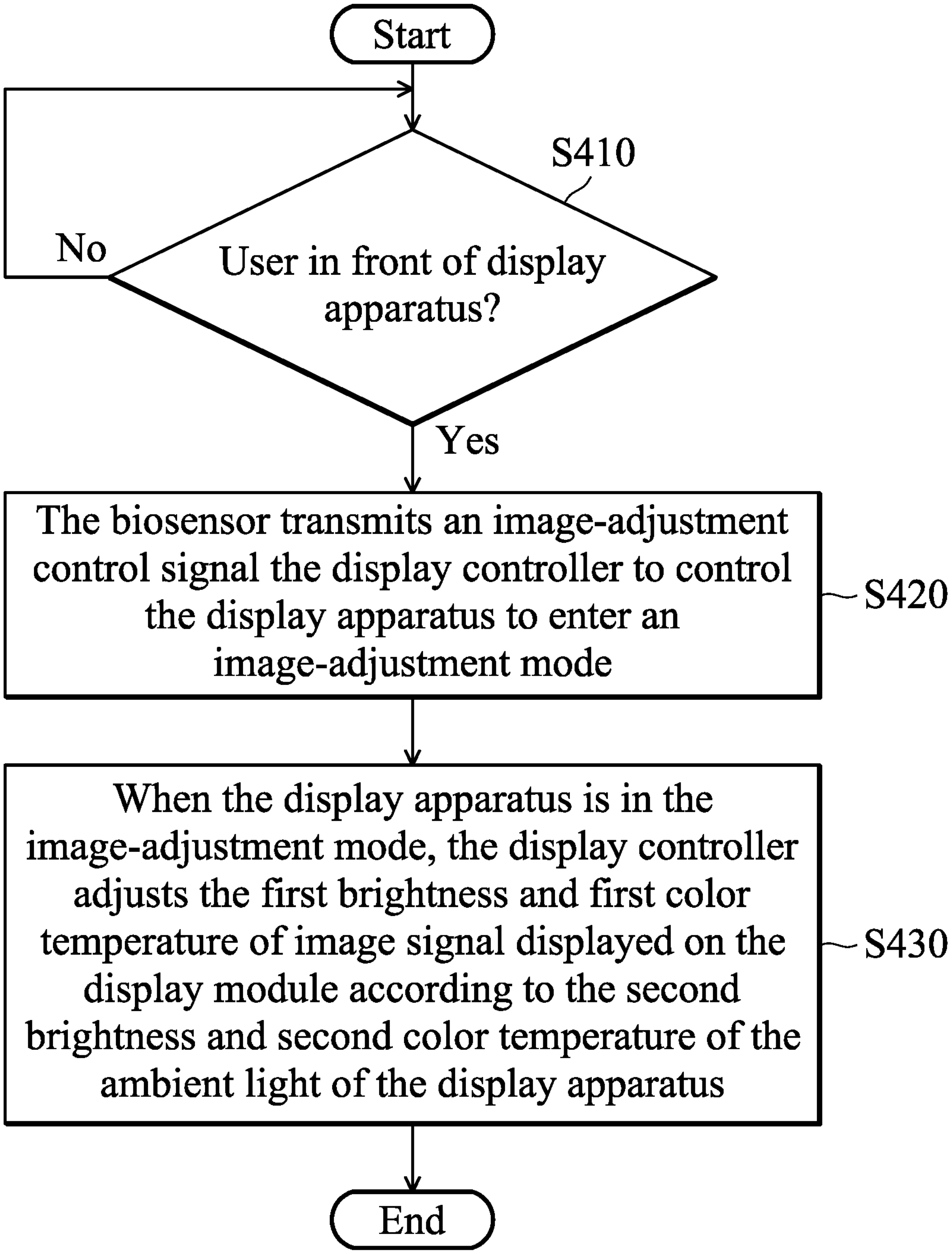
FIG. 4 is a flow chart of a method for calibrating screen dimming of the display apparatus in accordance with an embodiment of the invention.

FIG. 4 is a flow chart of a method for calibrating screen dimming of the display apparatus in accordance with an embodiment of the invention. Please refer to FIG. 1 and FIG. 4.

In step S410, the display controller 210 is utilized to receive an image signal from a host 100, and displays the image signal on the display module 220. For example, the host 100 may transmit the image signal to the display apparatus 200 through an image-transmission channel (e.g., HDMI, VGA, DisplayPort, or USB-C interfaces, etc.) between the host 100 and the display apparatus 200.

In step S420, when the biosensor 270 of the display apparatus 200 detects that a user is located in front of the display apparatus 200, the biosensor 270 transmits an image-adjustment control signal to the display controller 210 to control the display apparatus 200 to enter an image-adjustment mode. For example, when the biosensor 270 detects that a user is in front of the display apparatus 200, the biosensor 270 can further detect the distance between the user and the display apparatus, and can detect the user's heartbeat or pulse at the same time, and even the breathing rate. In some embodiments, the biosensor 270 can be implemented by, for example, a millimeter wave (mmWave) sensor, which can be disposed in front of the display apparatus 200 and emit millimeter waves with a frequency of 30 GHz to 300 GHz. When the user is located in front of the display apparatus 200, the millimeter waves emitted by the biosensor 270 will be reflected by the user, and the biosensor 270 can receive the reflected millimeter waves to detect tiny pulses, such as heartbeats, pulses, or a breathing rate, of the user. Accordingly, When the biosensor 270 has detected that the user is located within a predetermined distance range (e.g., 30 to 150 cm), the biosensor 270 may transmit an image-adjustment control signal and information about the heartbeat rate, pulse rate, or breathing rate to the display controller 210, wherein the display controller 210 may control the display apparatus 200 to enter an image-adjustment mode according to the image-adjustment control signal.

In step S430, when the display apparatus 200 is in the image-adjustment mode, the display controller 210 adjusts the brightness and color temperature of the ambient light of the display apparatus 200 to adjust the screen brightness and screen color temperature of the image signal displayed on the display module 220. For example, the picture-adjustment mode may include a first dynamic brightness-adjustment mode, a second dynamic brightness-adjustment mode, and a dynamic color-temperature adjustment mode. The first dynamic brightness-adjustment mode may further adjust the screen brightness of the display module 220 according to the distance D between the user 30 and the display module 220. The second dynamic brightness-adjustment mode may further adjust the screen brightness of the display module 220 for high ambient-light brightness and low ambient-light brightness. The dynamic color-temperature-adjustment mode may adjust the screen color temperature of the display module 220 for the ambient light with different color temperatures, so that the screen color temperature viewed by the user is similar to the color temperature of the ambient light, so as to reduce the burden on the user's eyes. For details of the first dynamic brightness-adjustment mode, the second dynamic brightness-adjustment mode, and the dynamic color-temperature-adjustment mode, please refer to the embodiments of FIGS. 2A-2C and 3A-3B.

In view of the above, a display apparatus and a method for calibrating screen dimming thereof are provided, wherein the image-adjustment mode includes a first dynamic brightness-adjustment mode, a second dynamic brightness-adjustment mode, and a dynamic color-temperature-adjustment mode that are used to adjust the brightness and color temperature of the image signal displayed on the display apparatus viewed by the user, so the user can have better visual effects under different usage scenarios (e.g., ambient light of different color temperatures and brightness, and different viewing distances), thereby improving the user's experience.

The use of terms such as "first", "second", and "third" in claims is used to modify elements in the claims, and is not used to indicate that there is a priority order, antecedent relationship, or Is an element preceded by another element, or a chronological order when performing a method step, only used to distinguish elements with the same name.

While the invention has been described by way of example and in terms of the preferred embodiments, it should be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A display apparatus, comprising:

a display module;

a biosensor;

an ambient-light sensor, configured to detect ambient-light brightness and an ambient-light color temperature of the display apparatus; and a display controller, configured to receive a video signal from a host, and displays the video signal on the display module;

wherein when the biosensor detects that a user is located in front of the display apparatus, the biosensor transmits an image-adjustment control signal to the display controller to control the display apparatus to enter an image-adjustment mode, wherein when the display apparatus is in the image-adjustment mode, the display controller adjusts screen brightness and a screen color temperature of the image signal displayed on the display module according to the ambient-light brightness and the ambient-light color temperature;

wherein the image-adjustment mode comprises a first dynamic brightness-adjustment mode, wherein in the first dynamic brightness-adjustment mode, the display controller further executes the following operations:

when the distance is longer than a first distance, increasing the screen brightness of the image signal displayed on the display module;

when the distance is between the first distance and half of the first distance, maintaining the screen brightness of the image signal displayed on the display module;

when the distance is shorter than half of the first distance, reducing the screen brightness of the image signal displayed on the display module by a first brightness ratio;

when the distance is shorter than a second distance, reducing the screen brightness of the image signal displayed on the display module by a second brightness ratio, wherein the first distance is greater than 2 times the second distance, and the second brightness ratio is greater than the first brightness ratio;

wherein the first distance corresponds to the user's optimal horizontal field of view (FoV), and the second distance corresponds to the user's maximum horizontal FoV.

2. The display apparatus as claimed in claim 1, further comprising: a distance sensor, configured to detect a distance and an orientation between the user and the display module, and to report the distance and the orientation to the display controller.

3. The display apparatus as claimed in claim 1, wherein the image-adjustment mode comprises a second dynamic brightness-adjustment mode, wherein in the second dynamic brightness-adjustment mode, the display controller further executes the following operations:

when the ambient-light brightness is between a first brightness and a second brightness, linearly adjusting the screen brightness of the display module at a first slope according to the ambient-light brightness;

when the ambient-light brightness is higher than or equal to the second brightness, linearly adjusting the screen brightness of the display module at a second slope according to the ambient-light brightness; and when the ambient-light brightness is lower than the first brightness, linearly adjusting the screen brightness of the display module at a third slope according to the ambient-light brightness, wherein the second brightness is higher than the first brightness, and the first slope, the second slope, and the third slope are greater than 0, and the second slope is greater than the first slope, and the first slope is greater than the third slope.

4. The display apparatus as claimed in claim 1, wherein the image-adjustment mode comprises a dynamic color-temperature-adjustment mode, wherein in the dynamic color-temperature-adjustment mode, the display controller further executes the following operations:

when the ambient-light color temperature is higher than a predetermined color temperature, increasing the screen color temperature of the image signal displayed on the display module; and when the ambient-light color temperature is lower than or equal to the predetermined color temperature, reducing the screen color temperature of the image signal displayed on the display module.

5. A method for calibrating screen dimming of a display apparatus, wherein the display apparatus comprises a display module, a biosensor, an ambient-light sensor, and a display controller, and the ambient-light sensor detects ambient-light brightness and an ambient-light color temperature of the display apparatus, the method comprising:

utilizing the display controller to receive a video signal from a host, and displaying the video signal on the display panel;

when the biosensor detects that a user is located in front of the display apparatus, utilizing the biosensor to transmit an image-adjustment control signal to the display controller to control the display apparatus to enter an image-adjustment mode; and when the display apparatus is in the image-adjustment mode, utilizing the display controller to adjust screen brightness and a screen color temperature of the image signal displayed on the display module according to the ambient-light brightness and the ambient-light color temperature;

wherein the image-adjustment mode comprises a first dynamic brightness-adjustment mode, and in the first dynamic brightness-adjustment mode, the method further comprises:

when the distance is longer than a first distance, increasing the screen brightness of the image signal displayed on the display module;

when the distance is between the first distance and half of the first distance, maintaining the screen brightness of the image signal displayed on the display module;

when the distance is shorter than half of the first distance, reducing the screen brightness of the image signal displayed on the display module by a first brightness ratio; and when the distance is shorter than a second distance, reducing the screen brightness of the image signal displayed on the display module by a second brightness ratio, wherein the first distance is greater than 2 times the second distance, and the second brightness ratio is greater than the first brightness ratio;

wherein the first distance corresponds to the user's optimal horizontal field of view (FoV), and the second distance corresponds to the user's maximum horizontal FoV.

6. The method as claimed in claim 5, wherein the display apparatus further comprises a distance sensor, configured to detect a distance and an orientation between the user and the display module, and to report the distance and the orientation to the display controller.

7. The method as claimed in claim 5, wherein the image-adjustment mode comprises a second dynamic brightness-adjustment mode, and in the second dynamic brightness-adjustment mode, the method further comprises:

when the ambient-light brightness is between a first brightness and a second brightness, linearly adjusting the screen brightness of the display module at a first slope according to the ambient-light brightness;

when the ambient-light brightness is higher than or equal to the second brightness, linearly adjusting the screen brightness of the display module at a second slope according to the ambient-light brightness; and when the ambient-light brightness is lower than the first brightness, linearly adjusting the screen brightness of the display module at a third slope according to the ambient-light brightness, wherein the second brightness is higher than the first brightness, and the first slope, the second slope, and the third slope are greater than 0, and the second slope is greater than the first slope, and the first slope is greater than the third slope.

8. The method as claimed in claim 5, wherein the image-adjustment mode comprises a dynamic color-temperature-adjustment mode, and in the dynamic color-temperature-adjustment mode, the method further comprises:

when the ambient-light color temperature is higher than a predetermined color temperature, increasing the screen color temperature of the image signal displayed on the display module; and when the ambient-light color temperature is lower than or equal to the predetermined color temperature, reducing the screen color temperature of the image signal displayed on the display module.

9. A display apparatus, comprising:

a display module;

a biosensor;

an ambient-light sensor, configured to detect ambient-light brightness and an ambient-light color temperature of the display apparatus; and a display controller, configured to receive a video signal from a host, and displays the video signal on the display module;

wherein when the biosensor detects that a user is located in front of the display apparatus, the biosensor transmits an image-adjustment control signal to the display controller to control the display apparatus to enter an image-adjustment mode, wherein when the display apparatus is in the image-adjustment mode, the display controller adjusts screen brightness and a screen color temperature of the image signal displayed on the display module according to the ambient-light brightness and the ambient-light color temperature;

wherein the image-adjustment mode comprises a second dynamic brightness-adjustment mode, wherein in the second dynamic brightness-adjustment mode, the display controller further executes the following operations:

when the ambient-light brightness is between a first brightness and a second brightness, linearly adjusting the screen brightness of the display module at a first slope according to the ambient-light brightness;

when the ambient-light brightness is higher than or equal to the second brightness, linearly adjusting the screen brightness of the display module at a second slope according to the ambient-light brightness; and when the ambient-light brightness is lower than the first brightness, linearly adjusting the screen brightness of the display module at a third slope according to the ambient-light brightness, wherein the second brightness is higher than the first brightness, and the first slope, the second slope, and the third slope are greater than 0, and the second slope is greater than the first slope, and the first slope is greater than the third slope.

* * * * *